Patented May 27, 1947

2,421,046

UNITED STATES PATENT OFFICE 2,421,046

PLASTICIZED ETHYL CELLULOSE AND METHODS OF MAKING THE SAME

Arthur J. Warner, South Orange, and Willard de Camp Crater, Jr., New Brunswick, N. J., assignors to Federal Telephone and Radio Corporation, New York, N. Y., a corporation of Delaware No Drawing. Application June 30, 1945, Serial No. 602,692

5 Claims. (Cl. 106—191)

This invention relates to novel compositions of matter and to methods for preparing the same. In its more specific aspects the invention is directed to novel combinations of ethyl cellulose and a plasticizer therefor and to methods for making the same.

Prior to this invention, ethyl cellulose has been employed in various fields; but in the electrical insulation field, its use has been limited because the electrical characteristics, of the product containing a proportion thereof, have not met certain specifications. While the novel products of this invention find employment in various fields, such as molding compositions, coating compositions and the like, some of them are particularly suitable in the field of electrical insulation where high dielectric strength and low power loss characteristics are essential.

According to this invention, there are provided novel compositions comprising ethyl cellulose and a plasticizer which is either one or a combination of two or more of the following; liquid dimer of alpha-methyl para-methyl styrene, solid dimer of alpha-methyl para-methyl styrene, liquid trimer of alpha-methyl para-methyl styrene, and hydrogenated liquid dimer of alpha-methyl para-methyl styrene, said hydrogenated product being said dimer, with only the normally unsaturated side chain being completely saturated with hydrogen.

One of the preferred methods for obtaining the liquid dimer of alpha-methyl para-methyl styrene is described in the United States patent application of Arthur J. Warner et al., Serial No. 515,068, filing dated December 21, 1943, said application hereby being made part hereof.

As set forth in said application, said liquid dimer may be prepared by mixing monomeric alpha-methyl para-methyl styrene with a catalyst and preferably between about ½% and 10% by weight of activated dehydrated diatomaceous earth. This mixture is maintained at a temperature between 60° C. and the boiling point of the monomer until the refractive index of the liquid phase of the reaction mass is substantially stabilized, after which the liquid dimer of alpha-methyl para-methyl styrene is separated from the earth catalyst and other products which may be present. The catalysts preferably employed are those activated diatomaceous earths such as Floridin, fuller's earth and other similar bleaching or catalytic earths. When Floridin is used, it is first heated to a temperature between 200° C. and 400° C. and preferably between 325° C. and 375° C. for a period of two hours or longer in order to dehydrate and activate the same.

Solid dimeric alpha-methyl para-methyl styrene may be prepared in the manner set forth in the United States application of Bernard H. Kress, Serial No. 582,578, filed March 13, 1945, and hereby made part hereof. As set forth in said application, this solid dimer may be prepared by heating a quantity of monomeric liquid alpha-methyl para-methyl styrene to about 150° C. and then adding thereto from 2% to 10% by weight of a catalyst such as an activated diatomaceous earth, examples of which are fuller's earth and Floridin, which may be activated in the manner heretofore described. During the mixing and subsequently thereto, the mass is rapidly stirred and the temperature thereof is controlled and maintained in the range between 200° C. and 250° C. When the index of refraction at 20° C. of the liquid phase of said reaction mass reaches 1.5600, the reaction is substantially complete. The earth catalyst then may be separated from the liquid phase and the liquid phase may then be allowed to cool to room temperature whereby crystallization takes place and the solid crystals are dimeric alpha-methyl para-methyl styrene in the solid state. These solid crystals may be removed and purified in any convenient manner. This solid dimer alpha-methyl para-methyl styrene has a melting point of 40° C.–41° C. and a molecular weight of 264 corresponding to the formula $C_{20}H_{24}$. Instead of starting with monomeric alpha-methyl para-methyl styrene, solid dimeric alpha-methyl para-methyl styrene may be prepared by mixing liquid alpha-methyl para-methyl styrene with between 2% to 10% of one of said catalysts. This mixture is agitated and the temperature thereof is maintained between 200° C. and 250° C. for approximately 6 to 8 hours. The catalyst is removed therefrom and the solid dimeric alpha-methyl para-methyl styrene may be purified.

Hydrogenated dimeric alpha-methyl para-methyl styrene may be prepared in the manner set forth in the co-pending application of A. J. Warner and S. R. Hartstein, Serial No. 598,910, filed June 11, 1945, and executed the 7th day of June, 1945, and hereby made part hereof. As set forth in said application, liquid dimer of alpha-methyl para-methyl styrene may be hydrogenated by maintaining the same at a temperature of 50° C. to 180° C. and at a pressure of 200 to 4000 pounds per square inch, while passing hydrogen therethrough and in the presence of a nickel catalyst. The resultant hydrogenated liquid dimer of alpha-methyl para-methyl styrene is essentially the same as the unhydrogenated liquid dimer except that the normally unsaturated side chain thereof is completely saturated with hydrogen.

Trimeric alpha-methyl para-methyl styrene and methods for making the same are described in the co-pending patent application of Bernard H. Kress, Serial No. 597,604, filed June 4, 1945, and executed on the 29th day of May, 1945. As set forth in said application, this trimer may be prepared by agitating and maintaining a mixture of one of the aforesaid activated earth catalysts and monomeric alpha-methyl para-methyl styrene in the temperature range of 37° C. to 43° C. until the index of refraction of the liquid phase of the reaction mass at 20° C. is about 1.572 to 1.575. Then the catalyst is removed therefrom and the trimer may be separated by distilling the mass to distill off the other components.

Various types of ethyl cellulose may be employed and their ethoxy contents may vary over wide limits. All of those now available on the open market have been found satisfactory in the practice of this invention, although I prefer to employ those having an ethoxy content within the range of 43.5% to 50% and more preferably in the range of 44.5% to 48.5%.

The ratio by weight of the ethyl cellulose to said plasticizer may vary depending upon the nature of the desired final product and the use to which it is to be put, but generally it is within the range of from about 98 to 2 to 40 to 60 depending upon the type of end product desired. We have further discovered that large amounts of the plasticizer may be employed without bleeding. Substantially non-bleeding combinations may be made up even where the ratio by weight of ethyl cellulose to plasticizer is lower than 80 to 20 and as low as 60 to 40. These non-bleeding combinations where the ratio by weight of ethyl cellulose to plasticizer is in the range of from 80 to 20 to 60 to 40 have good low temperature flexibility, high temperature resistance, tensile strength and impact strength.

The novel combinations may be prepared by mixing a quantity of ethyl cellulose with a quantity of one of said plasticizers and the mixture is heated to an elevated temperature until solution or dispersion takes place. For this purpose the ethyl cellulose is first comminuted to the powdered form and placed in a steam jacketed or otherwise externally heated mixer and there is then added thereto the desired quantity of said plasticizer. This mixture is continuously agitated while its temperature is increased to about 275° F. to 450° F. preferably about 300° F. This mixture is maintained at this temperature and in the constant state of agitation until solution or uniform dispersion is produced. The solution or dispersion may then be cooled to room temperature. The consistency or stiffness of the mass may be controlled by varying the ratio of ethyl cellulose to the plasticizer.

For a fuller understanding of this invention, reference is invited to the following examples which are given by way of illustration and not limitation; all parts being given by weight unless otherwise specified.

*Example I*

80 parts of ethyl cellulose are mixed with about 20 parts of trimeric alpha-methyl para-methyl styrene. This mixture is agitated and heated to a temperature of approximately 300° F. to 350° F. The mixture is maintained in this condition of agitation and in said temperature range until a substantially uniform mass is produced where the ethyl cellulose is dissolved in said trimer. Then this homogeneous mass is either placed in pans or calendered or milled and then cooled to room temperature after which it may be comminuted and these comminuted particles either alone or in combination with other materials may be extruded or molded.

*Example II*

50 parts of ethyl cellulose are mixed with about 50 parts of liquid dimer alpha-methyl para-methyl styrene. This mixture is agitated and heated to a temperature of approximately 300° F. to 350° F. The mixture is maintained in this condition of agitation and in said temperature range until a substantially uniform mass is produced where the ethyl cellulose is dissolved in said dimer. Then this homogeneous mass is placed in pans or calendered or milled and then cooled to room temperature, after which it may be comminuted and these comminuted particles, either alone or in combination with other materials may be extruded or molded.

*Example III*

70 parts of ethyl cellulose are mixed with about 30 parts of hydrogenated liquid dimer alpha-methyl para-methyl styrene. This mixture is agitated and heated to a temperature of approximately 300° F. to 350° F. The mixture is maintained in this state of agitation and in said temperature range until a substantially uniform mass is produced where the ethyl cellulose is dissolved in said dimer. Then this homogeneous mass is placed in pans or calendered or milled and then cooled to room temperature, after which it may be comminuted and these comminuted particles, either alone or in combination with other materials may be extruded or molded.

Since certain changes in carrying out the above process and certain modifications in the compositions which embody the invention may be made without departing from its scope, it is intended that all matter contained in the description shall be interpreted as illustrative and not in a limiting sense.

It is also to be understood that the following claims are intended to cover all the generic and specific features of the invention herein described, and all statements of the scope of the invention, which as a matter of language might be said to fall therebetween.

We claim:

1. A novel composition of matter comprising ethyl cellulose plasticized with a plasticizer selected from the group consisting of liquid dimer of alpha-methyl para-methyl styrene, solid dimer of alpha-methyl para-methyl styrene, liquid trimer of alpha-methyl para-methyl styrene, and hydrogenated liquid dimer of alpha-methyl para-methyl styrene with only the normally unsaturated side chain of said dimer being completely saturated with hydrogen.

2. A novel composition of matter comprising ethyl cellulose plasticized with a plasticizer selected from the group consisting of liquid dimer of alpha-methyl para-methyl styrene, solid dimer of alpha-methyl para-methyl styrene, liquid trimer of alpha-methyl para-methyl styrene and hydrogenated liquid dimer of alpha-methyl para-methyl styrene with only the normally unsaturated side chain of said dimer being completely saturated with hydrogen, the ratio by weight of said ethyl cellulose to said plasticizer being in the range of from 80 to 20 to 60 to 40.

3. A novel composition of matter comprising ethyl cellulose plasticized with a plasticizer selected from the group consisting of liquid dimer of alpha-methyl para-methyl styrene, solid dimer of alpha-methyl para-methyl styrene, liquid trimer of alpha-methyl para-methyl styrene and hydrogenated liquid dimer of alpha-methyl para-methyl styrene with only the normally unsaturated side chain of said dimer being completely saturated with hydrogen, the ratio by weight of said ethyl cellulose to said plasticizer being in the range of from 80 to 20 to 60 to 40, the ethoxy content of said ethyl cellulose being in the range of from 44.5% to 48.5%.

4. A method comprising heating until solution takes place a mixture of ethyl cellulose and a plasticizer selected from the group consisting of liquid dimer of alpha-methyl para-methyl styrene, solid dimer of alpha-methyl para-methyl styrene, liquid trimer of alpha-methyl para-methyl styrene and hydrogenated liquid dimer of alpha-methyl para-methyl styrene with only the normally unsaturated side chain of said dimer being completely saturated with hydrogen, then cooling said solution to convert the same from a liquid to a solid state.

5. A method comprising maintaining at temperatures between about 275° F. to 450° F. until solution takes place a mixture of ethyl cellulose and a plasticizer selected from the group consisting of liquid dimer of alpha-methyl para-methyl styrene, solid dimer of alpha-methyl para-methyl styrene, liquid trimer of alpha-methyl para-methyl styrene and hydrogenated liquid dimer of alpha-methyl para-methyl styrene with only the normally unsaturated side chain of said dimer being completely saturated with hydrogen, then cooling said solution to convert the same from a liquid to a solid state, the ratio by weight of said ethyl cellulose to said plasticizer in said mixture being in the range of from 80 to 20 to 60 to 40.

ARTHUR J. WARNER.
WILLARD DE CAMP CRATER, JR.

REFERENCES CITED

The following references are of record in the file of this patent:

UNITED STATES PATENTS

| Number | Name | Date |
| --- | --- | --- |
| 2,386,507 | Quin | Oct. 9, 1945 |

FOREIGN PATENTS

| Number | Country | Date |
| --- | --- | --- |
| 506,160 | Great Britain | May 24, 1939 |
| 524,156 | Great Britain | July 31, 1940 |